United States Patent
Yang et al.

(10) Patent No.: US 10,522,852 B2
(45) Date of Patent: Dec. 31, 2019

(54) REINFORCEMENT STRUCTURE FOR BEAD SEAL IN A PLATE ASSEMBLY

(71) Applicants: GM GLOBAL TECHNOLOGY OPERATIONS LLC, Detroit, MI (US); Honda Motor Co., Ltd., Tokyo (JP)

(72) Inventors: Xi Yang, Bloomfield Hills, MI (US); Siguang Xu, Rochester Hills, MI (US); Liang Xi, Madison Heights, MI (US); Richard D. Blakeley, Ortonville, MI (US); Masaaki Sakano, Wako (JP); Yu Tomana, Wako (JP); Kentaro Ishida, Wako (JP)

(73) Assignees: GM Global Technology Operations LLC., Detroit, MI (US); Honda Motor Co., Ltd., Tokyo (JP)

( * ) Notice: Subject to any disclaimer, the term of this patent is extended or adjusted under 35 U.S.C. 154(b) by 365 days.

(21) Appl. No.: 15/425,069

(22) Filed: Feb. 6, 2017

(65) Prior Publication Data
US 2018/0226662 A1    Aug. 9, 2018

(51) Int. Cl.
*H01M 8/02* (2016.01)
*H01M 8/0276* (2016.01)
*C25B 9/00* (2006.01)

(52) U.S. Cl.
CPC ............. *H01M 8/0276* (2013.01); *C25B 9/00* (2013.01)

(58) Field of Classification Search
CPC .. F16J 15/0825; F16J 15/0837; F16J 15/0893; F16J 15/0843
USPC .................. 277/590, 591, 598, 593–595
See application file for complete search history.

(56) References Cited

U.S. PATENT DOCUMENTS

| | | | | |
|---|---|---|---|---|
| 4,196,913 A | * | 4/1980 | Oka ..................... | F16J 15/022 277/595 |
| 6,698,765 B2 | * | 3/2004 | Isogai ................ | F16J 15/0825 277/590 |
| 6,722,660 B2 | * | 4/2004 | Gernand ............. | F16J 15/061 277/591 |
| 6,814,357 B2 | * | 11/2004 | Diez .................... | F16J 15/0825 277/593 |
| 8,371,587 B2 | | 2/2013 | Fly et al. | |
| 8,603,704 B2 | | 12/2013 | Keyser et al. | |
| 2016/0178059 A1 | * | 6/2016 | Swasey ................. | F02F 11/002 277/593 |

* cited by examiner

*Primary Examiner* — Kristina R Fulton
*Assistant Examiner* — L. Susmitha Koneru
(74) *Attorney, Agent, or Firm* — Quinn IP Law

(57) ABSTRACT

A plate assembly includes a first plate having a planar portion and a first bead seal formed therein. The first bead seal includes a first end surface spaced away from the planar portion. The first bead seal includes first and second opposing sides extending away from the first end surface and contiguous with the planar portion. The first bead seal includes a first reinforcement structure having a first plurality of walls each intersecting the first opposing side of the first bead seal. The first plate includes a second bead seal formed therein. The first bead seal and the second bead seal may be joined via the first reinforcement structure such that the first plurality of walls of the first reinforcement structure each intersect a third opposing side of the second bead seal.

19 Claims, 4 Drawing Sheets

REINFORCEMENT STRUCTURE FOR BEAD SEAL IN A PLATE ASSEMBLY

INTRODUCTION

The present disclosure relates to a reinforcement structure for a bead seal in a plate assembly. Plate assemblies, including but not limited to fuel cells, employ a stack of plates that are held together and compressed. Bead seals are employed to prevent the leakage of fluids between the various plates and define a seal path. Due to multiple curvatures of the seal path, some areas exhibit large variation in pressure. It may be challenging to control bead pressure, particularly with double or triple bead seals in close proximity.

SUMMARY

A plate assembly includes a first plate having a planar portion and a first bead seal formed therein. The first bead seal includes a first end surface spaced away from the planar portion. The first bead seal includes first and second opposing sides extending away from the first end surface and contiguous with the planar portion. The first bead seal includes a first reinforcement structure. The first reinforcement structure has a first plurality of walls each intersecting the first opposing side of the first bead seal. The first reinforcement structure may have an arcuate shape.

A second reinforcement structure may be formed on the second opposing side of the first bead seal. The second reinforcement structure defines a second plurality of walls each intersecting the second opposing side. The second reinforcement structure extends in a direction opposite to the first reinforcement structure. The second reinforcement structure defines a closed end.

The first plate includes a second bead seal formed therein. The second bead seal includes a second end surface spaced away from the planar portion. The second bead seal includes third and fourth opposing sides extending away from the second end surface and contiguous with the planar portion. The first bead seal and the second bead seal may be joined via the first reinforcement structure such that the first plurality of walls of the first reinforcement structure each intersect the third opposing side of the second bead seal.

The first plate may define a plurality of openings. The first bead seal may circumscribe one of the plurality of openings. The first plate includes an active area having a plurality of sealing members spaced from one another. The second bead seal may circumscribe the active area and at least two of the plurality of openings. The first plate may have a substantially rectangular shape defining first and second plate edges. The active area may be positioned between the first and second plate edges.

A third reinforcement structure may be formed on the second opposing side of the second bead seal. The third reinforcement structure may define a closed end and be located directly across the first reinforcement structure. Fourth and fifth reinforcement structures may be formed on the third and fourth opposing sides of the second bead seal, respectively. The fourth and fifth reinforcement structures extend in opposite directions away from the second bead seal and each define a respective closed end. A first crossing plane is defined at an intersection of the first bead seal and the first reinforcement structure. A second crossing plane is defined at an intersection of the second bead seal and the first reinforcement structure. A barrier may be positioned on at least one of the first and second crossing planes, the barrier being configured to prevent fluid flow between the first bead seal and the second bead seal.

The first plate may include a third bead seal formed therein, with the third bead seal having a third end surface spaced away from the planar portion. The third bead seal includes fifth and sixth opposing sides extending away from the third end surface and contiguous with the planar portion. A plurality of sixth reinforcement structures repeating at a predefined fixed interval may be formed on the fifth opposing side of the third bead seal. A plurality of seventh reinforcement structures repeating at the predefined fixed interval may be formed on the sixth opposing side of the third bead seal. Each one of the plurality of sixth reinforcement structures may be located diagonally across from another one of the plurality of seventh reinforcement structures.

The above features and advantages and other features and advantages of the present disclosure are readily apparent from the following detailed description of the best modes for carrying out the disclosure when taken in connection with the accompanying drawings.

DETAILED DESCRIPTION

Figure 1:
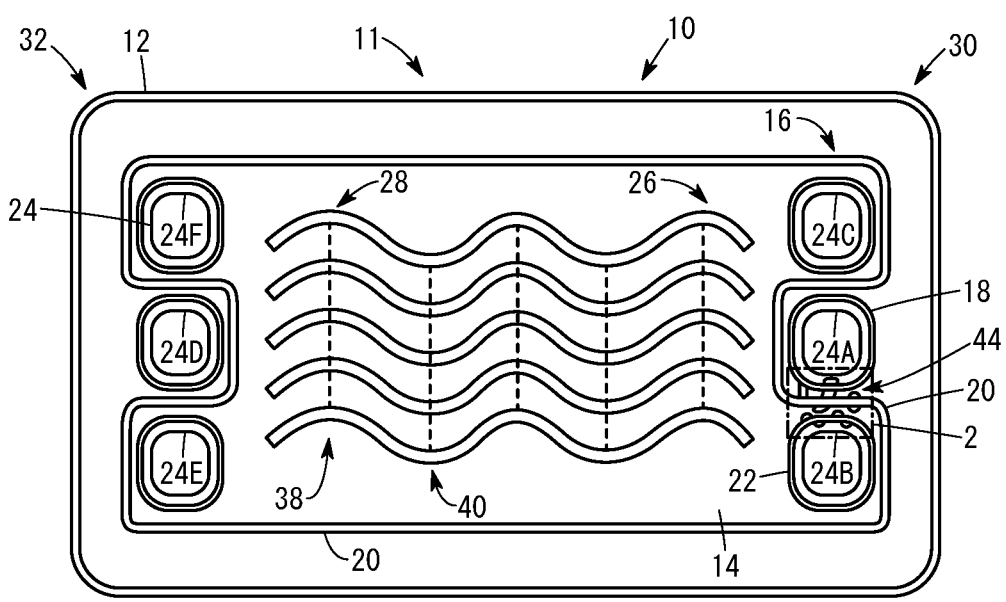
FIG. 1 is a schematic top view of a plate assembly having a first plate with a first bead seal.

Referring to the drawings, wherein like reference numbers refer to like components, FIG. 1 schematically illustrates schematic top view of a plate assembly 10. The assembly 10 may be part of a device 11. The device 11 may be a fuel cell, which combines a fuel such as hydrogen and an oxidant such as oxygen to generate electricity for powering various devices, including vehicles. For example, the device 11 may be an electrolyser or an electrochemical compressor system. The device 11 may take many different forms and include multiple and/or alternate components and facilities. Referring to FIG. 1, the assembly 10 includes a first plate 12 having a planar portion 14 (the assembly 10 may include a second plate 82, described below with reference to FIG. 3). The first plate 12 includes a plurality of elongated protuberances formed therein, referred to herein as a plurality of bead seals 16. The plurality of bead seals 16 may be formed via a stamping operation.

Figure 2:
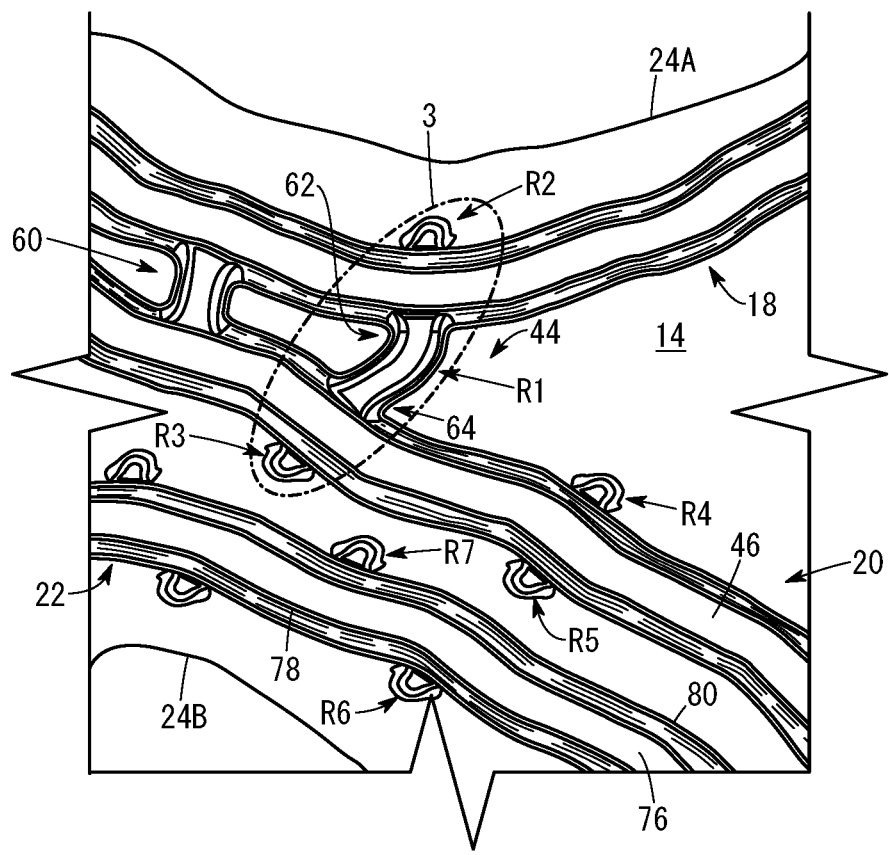
FIG. 2 is a schematic fragmentary perspective view of portion 2 of FIG. 1.

FIG. 2 is a schematic enlarged view of portion 2 of FIG. 1. Referring to FIGS. 1 and 2, the plurality of bead seals 16 includes a first bead seal 18, a second bead seal 20 and a third bead seal 22. Referring to FIG. 1, the first plate 12 defines a plurality of openings 24. In the embodiment shown, there are first through sixth openings 24A-F, however other numbers of openings may be employed. The first plate 12 includes a plurality of flow channels 28 configured to guide the reactants to flow across an active area 26. Referring to FIG. 1, the first plate 12 may have a substantially rectangular shape, defining first and second plate edges 30, 32. The active area 26 may be positioned between the first and second sets plate edges 30, 32. Referring to FIG. 1, the plurality of flow channels 28 may define a sinusoidal shape and may be positioned such that their respective maxima 38 and respective minima 40 are longitudinally aligned. Other arrangements employed by those skilled in the art may be used.

Referring to FIG. 1, the first bead seal 18 may circumscribe one of the openings 24, such as the first opening 24A. The third bead seal 22 may circumscribe another of the openings 24, such as the second opening 24B. The second bead seal 20 may extend along an outer periphery of the first plate 12. The second bead seal 20 may circumscribe the active area 26 and at least two of the plurality of openings 24, such as the second opening 24B and the third opening 24C. The second bead seal 20 may circumscribe four of the plurality of openings (e.g. openings 24B, C, E, F) and the active area 26. The second opening 24B is encapsulated by both the second bead seal 20 and the third bead seal 22. It is understood that other arrangements employed by those skilled in the art may be used.

Referring now to FIG. 1, the first plate 12 includes a plurality of reinforcement structures 44 on the first bead seal 18 and/or second bead seal 20. The plurality of reinforcement structures 44 may be formed via a stamping operation and help even out contact pressure on the sealing surface of the first and second bead seals 18, 20. Referring to FIG. 2, first, second, third, fourth and fifth reinforcement structures R1, R2, R3, R4 and R5, are shown. Due to multiple curvatures of the seal path (defined by the first and second bead seals 18, 20), some areas exhibit low pressure. A large pressure variation is observed, particularly where double or triple bead seals are in close proximity since bead pressure is affected by neighboring beads. Each of the plurality of reinforcement structures 44 help to eliminate low pressure spots, improve contact pressure uniformity and increase bead stiffness. The respective seal paths remain unchanged.

Figure 3:
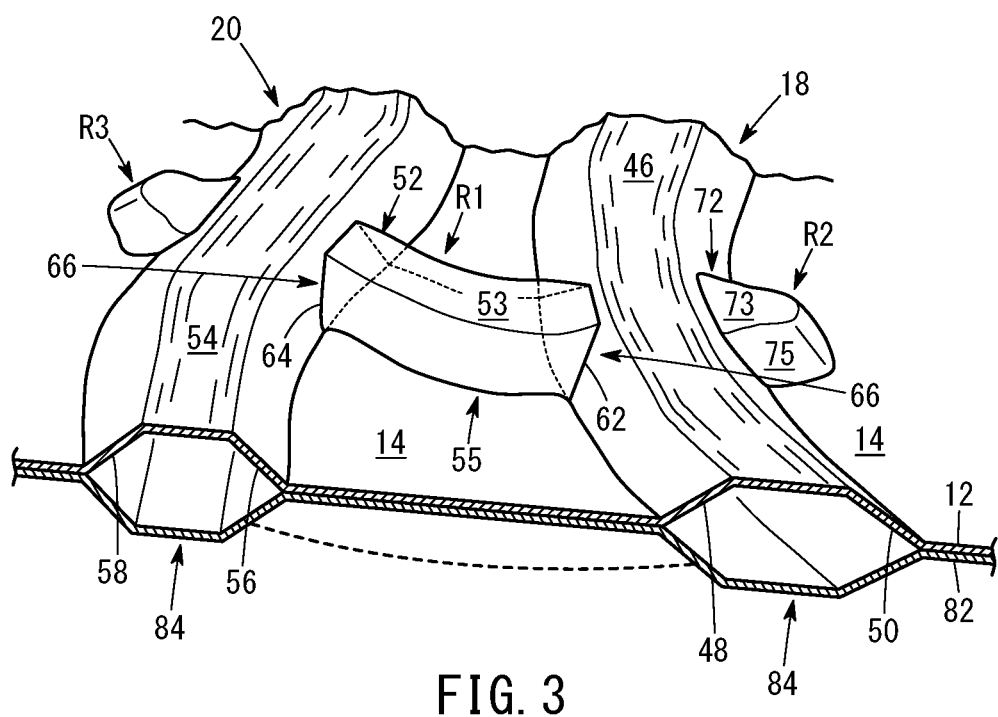
FIG. 3 is a schematic fragmentary partly-perspective partly-sectional view of the portion 3 of FIG. 2.

FIG. 3 is a schematic view of the portion 3 of FIG. 2. Referring to FIGS. 2-3, the first bead seal 18 includes a first end surface 46 spaced away from the planar portion 14 of the first plate 12. The first bead seal 18 includes first and second opposing sides 48, 50 extending away from the first end surface 46 and contiguous with the planar portion 14. Referring to FIG. 3, the first reinforcement structure R1 has a first plurality of walls 52 each intersecting the first opposing side 48 of the first bead seal 18. The first plurality of walls 52 includes a closed top surface 53, referred to herein as reinforcement surface 53, and reinforcement sides 55, shown in FIG. 3. Referring to FIG. 3, the second bead seal 20 includes a second end surface 54 spaced away from the planar portion 14. The second bead seal 20 includes third and fourth opposing sides 56, 58 extending away from the second end surface 54 and contiguous with the planar portion 14. The height of the reinforcement surface 53 of the first reinforcement structure R1 from the planar portion 14 is lower than the height of the first end surface 46 from the planar portion 14, and the reinforcement surface 53 is not brought into contact with the sealing surface. The height of the first end surface 46 from the planar portion 14 is the same as the height of the second end surface 54 from the planar portion 14. Also, the height of the third bead seal 22 from the planar portion 14 is the same as the height of the first end surface 46 and the second end surface 54 from the planar portion 14. The first end surface 46 and the second end surface 54 are brought into contact with a MEA (not shown) and receive compressive loads.

Referring to FIG. 3, the first reinforcement structure R1 may connect the first bead seal 18 and the second bead seal 20, such that the first plurality of walls 52 (of the first reinforcement structure R1) each intersect the third opposing side 56 of the second bead seal 20. Referring to FIG. 2, the first reinforcement structure R1 may have an arcuate shape. Referring to FIG. 2, an additional reinforcement structure 60 and the first reinforcement structure R1 may connect the first and second bead seals 18, 20 and extend in a direction substantially perpendicular to at least one of the first bead seal 18 and the second bead seal 20. In a case the first and second bead seals 18, 20 are not in parallel with each other, the first reinforcement structure R1 includes a curved intermediate portion.

Referring to FIGS. 2-3, a first crossing plane 62 is defined at the intersection of the first bead seal 18 and the first reinforcement structure R1. A second crossing plane 64 is defined at the intersection of the second bead seal 20 and the first reinforcement structure R1. Referring to FIG. 3, a barrier 66 may be positioned at one or both of the first and second crossing planes 62, 64 and configured to prevent fluid flow between the first bead seal 18 and the second bead seal 20. The barrier 66 may be composed of an elastomer, metal or other material. Alternatively, the first and second crossing planes 62, 64 may be open to permit fluid flow between the first bead seal 18 and the second bead seal 20.

Referring to FIGS. 1-3, the second reinforcement structure R2 may be formed on the second opposing side 50 of the first bead seal 18. The second reinforcement structure R2 defines a second plurality of walls 72, including a reinforcement surface 73 and reinforcement sides 75, each intersecting the second opposing side 50 at a proximal end. The second plurality of walls 72 may be joined together to define a closed end at a distal end. The height of the reinforcement surface 73 of the second reinforcement structure R2 from the planar portion 14 is lower than the height of the first end surface 46 from the planar portion 14, and the reinforcement surface 73 is not brought into contact with the sealing surface. The second reinforcement structure R2 may extend in a direction opposite to the first reinforcement structure R1. Referring to FIGS. 2-3, a third reinforcement structure R3 may be formed on the fourth opposing side 58 of the second bead seal 20. The height of a top surface of the third reinforcement structure R3 from the planar portion 14 is lower than the height of the second end surface 54 from the planar portion 14, and the top surface is not brought into contact with the sealing surface. The third reinforcement structure R3 may define a closed end and be located directly across the first reinforcement structure R1. The third reinforcement structure R3 has a structure similar to that of the above-mentioned second reinforcement structure R2.

Referring to FIG. 2, the second bead seal 20 may include fourth and fifth reinforcement structures R4, R5 formed on the third and fourth opposing sides 56, 58, respectively. The fourth and fifth reinforcement structures R4, R5 are located directly across from each other. The fourth and fifth reinforcement structures R4, R5 extend in opposite directions away from the second bead seal 20, each defining a closed end. The first bead seal 18 and/or the third bead seal 22 may include reinforcement structures located directly across from each other, in a similar manner to the fourth and fifth reinforcement structures R4, R5.

Referring to FIG. 2, the third bead seal 22 includes a third end surface 76 spaced away from the planar portion 14. The third bead seal 22 includes fifth and sixth opposing sides 78, 80 extending away from the third end surface 76 and contiguous with the planar portion 14. Referring to FIG. 2, the third bead seal 22 may include a plurality of sixth reinforcement structures R6 repeating at a predefined fixed interval on the fifth opposing side 78. The third bead seal 22 may include a plurality of seventh reinforcement structures R7 repeating at the predefined fixed interval on the sixth opposing side 80.

The plurality of sixth and seventh reinforcement members R6, R7 reduce the bead pressure at the center of the third bead seal 22. Each one of the plurality of sixth reinforcement structures R6 may be located diagonally across (i.e. kitty corner) from another one of the plurality of seventh reinforcement structures R7. Stated differently, plurality of sixth and seventh reinforcement members R6, R7 are not directly across from each other. This diagonal positioning achieves further uniformity of pressure distribution. The first bead seal 18 and/or the second bead seal 20 may include diagonal positioning reinforcement structures, in a similar manner to the sixth and seventh reinforcement structures R6, R7.

Referring to FIG. 3, the assembly 10 may include a second plate 82 having a second plurality of bead seals 84 that are a mirror image of the plurality of bead seals 16, and are configured to prevent the leakage of fluids between the first and second plates 12, 82. It is to be understood that the assembly 10 may include any number of plates, as unipolar or bipolar plates. The outer surface of the first plate 12 may define flow paths for delivery of an oxidant reactant, while the outer surface of the second plate 82 may define flow paths for delivery of a hydrogen reactant (or vice-versa), for generation of electric power. The first and second plates 12, 82 may be part of a stack (not shown) of over a hundred plates that are compressed and held together.

Figure 4:
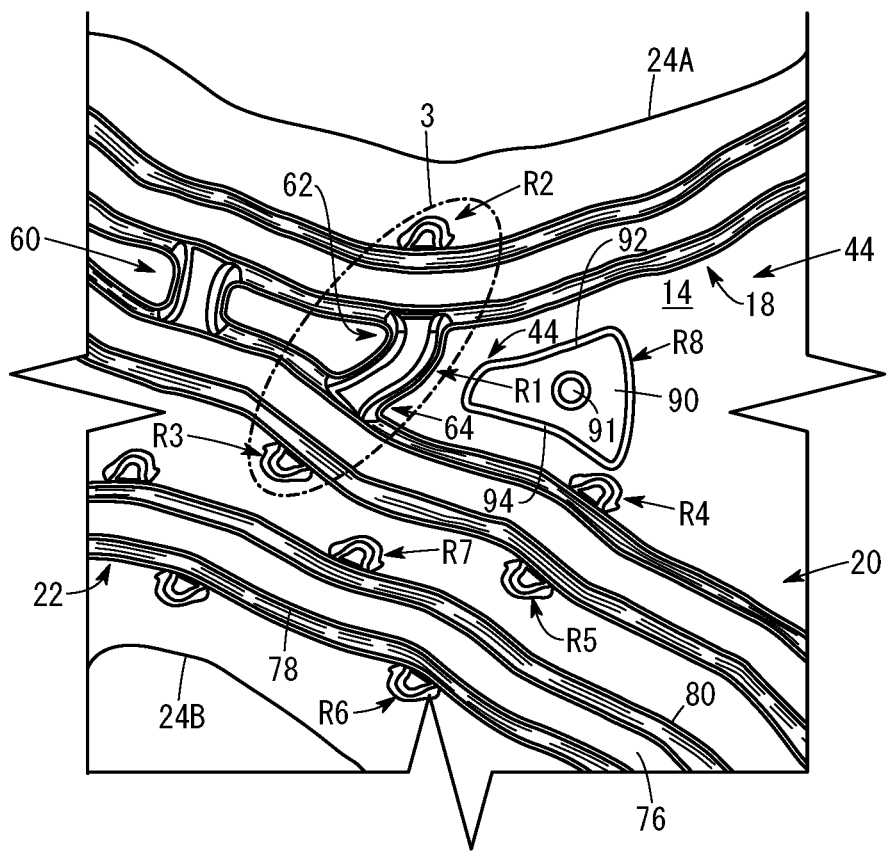
FIG. 4 is a schematic fragmentary perspective view of a plate assembly according to another embodiment.

Referring to FIG. 4, the assembly 10 may include an eighth reinforcement structure R8 protruding from the planar portion 14 adjacently to (or in the vicinity of) the first bead seal 18 and the second bead seal 20. The eighth reinforcement structure R8 is not directly contiguous with the first bead seal 18 and the second bead seal 20 but provided between the first bead seal 18 and the second bead seal 20. The eighth reinforcement structure R8 has a substantially triangular shape since it is positioned between the first bead seal 18 and the second bead seal 20 which are not in parallel with each other.

The eighth reinforcement structure R8 includes a top surface 90 spaced away from the planar portion 14, a first side 92 facing and extending along the first opposing side 48 of the first bead seal 18, and a second side 94 facing and extending along the third opposing side 56 of the second bead seal 20. The top surface 90 includes a recessed or concave portion 91. The recessed portion 91 improves rigidity of the reinforcement structure R8.

The first side 92 is formed to have an arcuate or concave shape (curved shape) along a curved portion of the wavy first bead seal 18 (the first opposing side 48) where the first side 92 faces. The first side 92 is contiguous with the top surface 90 and the planar portion 14. The second side 94 is formed to have an arcuate or concave shape (curved shape) along a curved portion of the wavy second bead seal 20 (the third opposing side 56) where the second side 94 faces. The second side 94 is contiguous with the top surface 90 and the planar portion 14.

Further, in a case the portion of the wavy first bead seal 18 where the first side 92 faces has a concave shape away from the eighth reinforcement structure R8, the first side 92 may preferably have an arcuate or convex shape (curved shape) toward the first bead seal 18. Also, in a case the portion of the wavy second bead seal 20 where the second side 94 faces has a concave shape away from the eighth reinforcement structure R8, the second side 94 may preferably have an arcuate or convex shape (curved shape) toward the second bead seal 20.

The eighth reinforcement structure R8 may include a portion (protuberance) having the first side 92 and another portion (protuberance) having the second side 94, separately from each other.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A plate assembly comprising:
   a first plate having a planar portion and having a first bead seal formed therein;
   wherein the first bead seal has a first end surface substantially parallel to and spaced away from the planar portion by a first height, the first height being in a direction perpendicular to the first end surface;
   wherein the first bead seal includes first and second opposing sides extending away from the first end surface and contiguous with the planar portion;
   wherein the first bead seal includes a first reinforcement structure defining a reinforcement surface substantially parallel to and spaced away from the planar portion by a second height, the second height being less than the first height; and
      wherein the first reinforcement structure has a first plurality of walls each intersecting the first opposing side of the first bead seal.

2. The assembly of claim 1, wherein:
   the first reinforcement structure has an arcuate shape.

3. The assembly of claim 1, further comprising:
   a second reinforcement structure formed on the second opposing side of the first bead seal, the second reinforcement structure defining a second plurality of walls each intersecting the second opposing side;
   wherein the second reinforcement structure extends in a direction opposite to the first reinforcement structure; and
   wherein the second reinforcement structure defines a closed end.

4. The assembly of claim 1, wherein:
   the first plate includes a second bead seal formed therein;
   the second bead seal includes a second end surface substantially parallel to and spaced away from the planar portion by the first height;
   the second bead seal includes third and fourth opposing sides extending away from the second end surface and contiguous with the planar portion; and
   the first bead seal and the second bead seal are joined via the first reinforcement structure such that the first plurality of walls of the first reinforcement structure intersect the third opposing side.

5. The assembly of claim 4, further comprising:
a third reinforcement structure formed on the fourth opposing side of the second bead seal, the third reinforcement structure defining a closed end and located directly across the first reinforcement structure.

6. The assembly of claim 4, further comprising:
fourth and fifth reinforcement structures formed on the third and fourth opposing sides of the second bead seal, respectively;
wherein the fourth and fifth reinforcement structures extend in opposite directions away from the second bead seal and each define a respective closed end.

7. The assembly of claim 4, further comprising:
a first crossing plane defined at an intersection of the first bead seal and the first reinforcement structure;
a second crossing plane defined at an intersection of the second bead seal and the first reinforcement structure; and
a barrier positioned on at least one of the first and second crossing planes, the barrier being configured to prevent fluid flow between the first bead seal and the second bead seal.

8. The assembly of claim 4, wherein:
the first plate includes a third bead seal formed therein;
the third bead seal includes a third end surface substantially parallel to and spaced away from the planar portion by the first height;
the third bead seal includes fifth and sixth opposing sides extending away from the third end surface and contiguous with the planar portion; and further comprising:
a plurality of sixth reinforcement structures repeating at a predefined fixed interval on the fifth opposing side of the third bead seal;
a plurality of seventh reinforcement structures repeating at the predefined fixed interval on the sixth opposing side of the third bead seal; and
wherein each one of the plurality of sixth reinforcement structures is located diagonally across from another one of the plurality of seventh reinforcement structures.

9. The assembly of claim 4, wherein:
the first plate defines a plurality of openings, the first bead seal circumscribing one of the plurality of openings; and
the second bead seal circumscribes at least two of the plurality of openings, the second bead seal extending along an outer periphery of the first plate.

10. The assembly of claim 9, wherein:
the first plate includes an active area having a plurality of sealing members spaced from one another, the second bead seal circumscribing the active area;
the first plate has a substantially rectangular shape defining first and second plate edges; and
the active area is positioned between the first and second plate edges.

11. A plate assembly comprising:
a first plate having a planar portion and defining a plurality of openings;
wherein the first plate includes a first bead seal formed therein;
wherein the first bead seal has a first end surface substantially parallel to and spaced away from the planar portion by a first height, the first height being in a direction perpendicular to the first end surface;
wherein the first bead seal includes first and second opposing sides extending away from the first end surface and contiguous with the planar portion;
wherein the first bead seal includes a first reinforcement structure defining a reinforcement surface substantially parallel to and spaced away from the planar portion by a second height, the second height being less than the first height;
wherein the first reinforcement structure has a first plurality of walls each intersecting the first opposing side of the first bead seal;
wherein the first plate includes a second bead seal formed therein, the second bead seal having a second end surface substantially parallel to and spaced away from the planar portion by the first height;
wherein the second bead seal includes third and fourth opposing sides extending away from the second end surface and contiguous with the planar portion; and
wherein the first bead seal and the second bead seal are joined via the first reinforcement structure such that the first plurality of walls of the first reinforcement structure intersect the third opposing side.

12. The assembly of claim 11, wherein:
the first plate defines a plurality of openings, the first bead seal circumscribing one of the plurality of openings; and
the second bead seal circumscribes at least two of the plurality of openings, the second bead seal extending along an outer periphery of the first plate;
the first plate includes an active area having a plurality of sealing members spaced from one another, the second bead seal circumscribing the active area;
the first plate has a substantially rectangular shape defining first and second plate edges; and
the active area is positioned between the first and second plate edges.

13. The assembly of claim 11, further comprising:
a first crossing plane defined at an intersection of the first bead seal and the first reinforcement structure;
a second crossing plane defined at an intersection of the second bead seal and the first reinforcement structure; and
a barrier positioned on at least one of the first and second crossing planes, the barrier being configured to prevent fluid flow between the first bead seal and the second bead seal.

14. The assembly of claim 11, wherein:
the first plate includes a third bead seal formed therein;
the third bead seal includes a third end surface substantially parallel to and spaced away from the planar portion by the first height;
the third bead seal includes fifth and sixth opposing sides extending away from the third end surface and contiguous with the planar portion; and further comprising:
a plurality of sixth reinforcement structures formed on the fifth opposing side of the third bead seal and repeating at a predefined fixed interval;
a plurality of seventh reinforcement structures formed on the sixth opposing side of the third bead seal and repeating at the predefined fixed interval; and
wherein each one of the plurality of sixth reinforcement structures is located diagonally across from another one of the plurality of seventh reinforcement structures.

15. A plate assembly comprising:
a first plate having a planar portion and having a first bead seal formed therein;
wherein the first bead seal has a first end surface substantially parallel to and spaced away from the planar portion by a first height, the first height being in a direction perpendicular to the first end surface;

wherein the first bead seal includes first and second opposing sides extending away from the first end surface and contiguous with the planar portion;

wherein the first bead seal further comprises a reinforcement structure protruding away from the planar portion by a second height, the second height being less than the first height;

wherein the reinforcement structure has a first side which is spaced away from and faces the first opposing side of the first bead seal, the first side extending along the first opposing side; and wherein the reinforcement structure includes a top surface having a recessed portion.

16. The assembly of claim 15, wherein:

the first plate has a second bead seal protrudingly formed therefrom;

the second bead seal has a second end surface substantially parallel to and spaced away from the planar portion by the first height;

the second end surface has third and fourth opposing sides extending away from the second end surface and contiguous with the planar portion; and the reinforcement structure is positioned between the first bead seal and the second bead seal, and has a second side, the second side being spaced away from and facing the third opposing side of the second bead seal, the second side extending along the third opposing side.

17. The assembly of claim 16, wherein:

a portion of the first bead seal and a portion of the second bead seal are not in parallel with each other; and the reinforcement structure has a substantially triangular shape and is positioned between the portion of the first bead seal and the portion of the second bead seal which are not in parallel with each other.

18. The assembly of claim 4, further comprising:

a first crossing plane defined at an intersection of the first bead seal and the first reinforcement structure;

a second crossing plane defined at an intersection of the second bead seal and the first reinforcement structure; and wherein the first crossing plane and the second crossing plane are configured to permit fluid flow between the first bead seal and the second bead seal.

19. The assembly of claim 11, further comprising:

a first crossing plane defined at an intersection of the first bead seal and the first reinforcement structure;

a second crossing plane defined at an intersection of the second bead seal and the first reinforcement structure; and wherein the first crossing plane and the second crossing plane are configured to permit fluid flow between the first bead seal and the second bead seal.

* * * * *